US012644755B2

(12) United States Patent
Ekegren et al.

(10) Patent No.: US 12,644,755 B2
(45) Date of Patent: Jun. 2, 2026

(54) DEVICE AND METHOD FOR WEIGHING A SPOOL

(71) Applicant: VALMET AB, Sundsvall (SE)

(72) Inventors: Patric Ekegren, Karlstad (SE);
Johanna Pihl, Karlstad (SE); Mickey Lindewall, Hammarö (SE); Ola Adamsson, Hammarö (SE); Lars P. Hellström, Karlstad (SE)

(73) Assignee: VALMET AB, Sundsvall (SE)

( * ) Notice: Subject to any disclaimer, the term of this patent is extended or adjusted under 35 U.S.C. 154(b) by 307 days.

(21) Appl. No.: 18/702,884

(22) PCT Filed: Oct. 25, 2022

(86) PCT No.: PCT/EP2022/079680
§ 371 (c)(1),
(2) Date: Apr. 19, 2024

(87) PCT Pub. No.: WO2023/088642
PCT Pub. Date: May 25, 2023

(65) Prior Publication Data
US 2024/0410740 A1    Dec. 12, 2024

(30) Foreign Application Priority Data

Nov. 16, 2021    (SE) .................................... 2130309-4

(51) Int. Cl.
| *G01G 17/02* | (2006.01) |
| *B65H 19/22* | (2006.01) |
| *B65H 19/30* | (2006.01) |

(52) U.S. Cl.
CPC ............. *G01G 17/02* (2013.01); *B65H 19/22* (2013.01); *B65H 19/30* (2013.01);
(Continued)

(58) Field of Classification Search
CPC ...... G01G 17/02; G01G 19/047; G01G 11/14; G01G 19/00; G01G 13/00; G01G 19/4144;
(Continued)

(56) References Cited

U.S. PATENT DOCUMENTS

| 3,190,382 A | 6/1965 | Zimmerman | |
| 3,734,216 A | 5/1973 | Nordstrom et al. | |
| 7,344,105 B2 * | 3/2008 | Lindsey ................ | B65H 18/26 242/534 |

FOREIGN PATENT DOCUMENTS

| AT | 525229 A1 * | 1/2023 | ............. G01G 21/23 |
| CN | 102519561 A | 6/2012 | |
(Continued)

OTHER PUBLICATIONS

International Search Report and Written Opinion for Patent Cooperation Treaty Application No. PCT/EP2022/079680, dated Feb. 20, 2023, 10 pages.

*Primary Examiner* — Andre J Allen
(74) *Attorney, Agent, or Firm* — Alston & Bird LLP

(57) ABSTRACT

A device and a method for weighing a roll of continuous web material on a spool at a weigh-ing station in a continuous process is described, which has fewer mechanical parts and is safer to use than prior devices and methods. The device is arranged adjacent to at least one of a pair of guide rails and comprises a damper and a load cell, wherein the load cell is integrated into at least one guide rail.

19 Claims, 7 Drawing Sheets

Figures 1A, 1B:
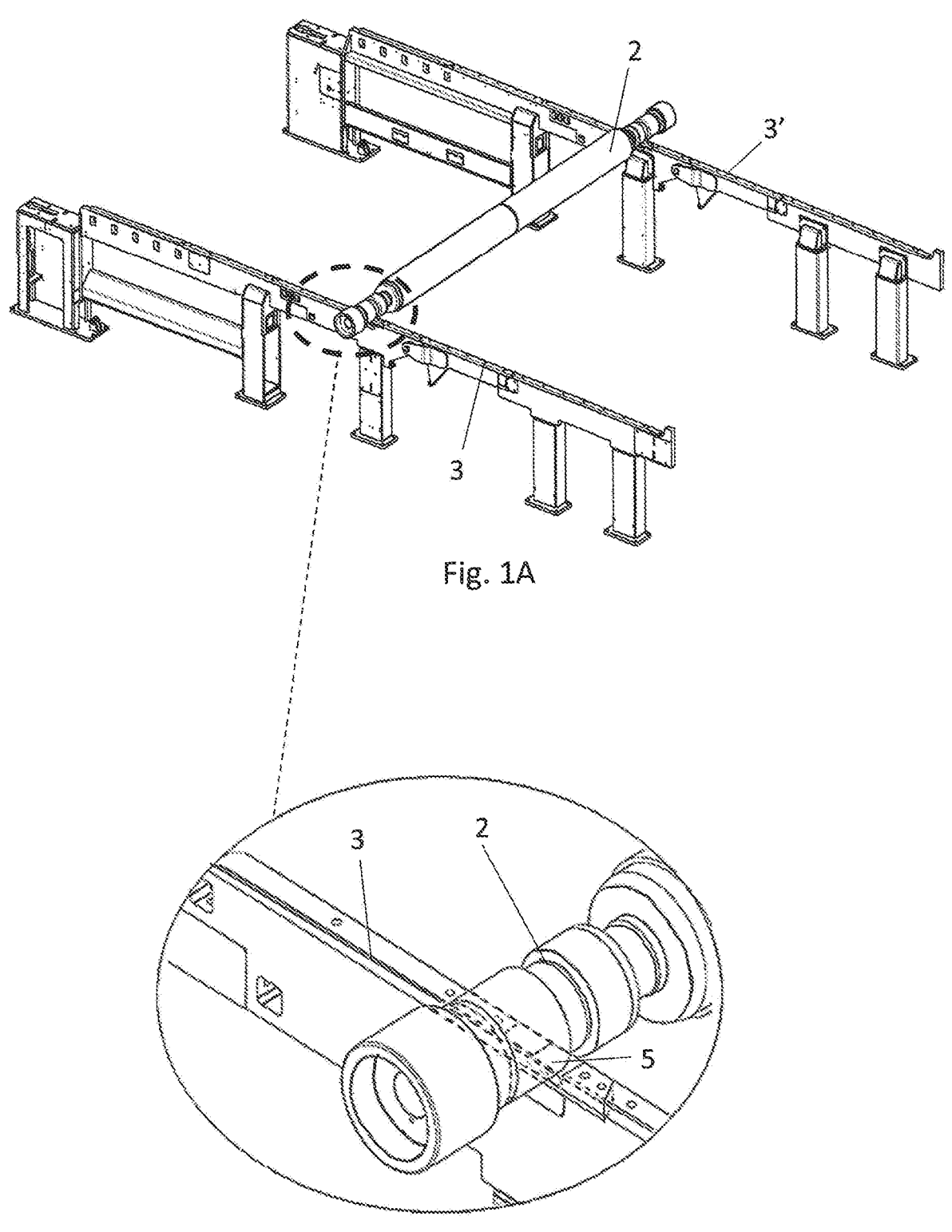

(52) U.S. Cl.
CPC ..................... *B65H 2220/03* (2013.01); *B65H 2301/41734* (2013.01); *B65H 2515/10* (2013.01)

(58) Field of Classification Search
CPC ........ G01G 19/62; G01G 21/04; G01G 21/10; G01G 23/06; G01G 23/42; G01G 5/00; G01G 5/06; B65H 2701/31; B65H 75/14; B65H 2701/36; B65H 49/32; B65H 2701/35; B65H 67/04; B65H 67/064; B65H 2301/41342; B65H 49/321; B65H 49/325; B65H 49/36; B65H 54/22; B65H 54/543; B65H 67/0411; B65H 67/08; B65H 19/30; B65H 2402/412; B65H 2405/422; B65H 2701/33; B65H 54/54; B65H 75/18; B65H 18/10; B65H 2220/03; B65H 2301/414323; B65H 2301/41734; B65H 2402/42; B65H 2515/10; B65H 2701/34; B65H 2701/51344; B65H 2801/93; B65H 49/34; B65H 49/38; B65H 59/04; B65H 75/02; B65H 75/025; B65H 75/20; B65H 75/50; B65H 2402/52; B65H 2701/354; B65H 2701/5124; B65H 2701/5134; B65H 2701/5136; B65H 2701/514; B65H 2701/534; B65H 63/006; B65H 75/2227; B65H 2402/414; B65H 49/20; B65H 49/28; B65H 49/328; B65H 75/12; B65H 75/185; B65H 75/2245; B65H 75/2281; B65H 75/229; B65H 18/04; B65H 19/12; B65H 2301/4132; B65H 2301/41368; B65H 2301/4173; B65H 49/327; B65H 54/553; B65H 59/22; B65H 63/084; B65H 63/086; B65H 67/00; B65H 67/063; B65H 67/065; B65H 75/2263; B65H 75/24; B65H 75/40; B65H 16/024; B65H 18/028; B65H 19/126; B65H 19/1852; B65H 19/1873; B65H 2220/01; B65H 2220/02; B65H 23/198; B65H 2301/41392; B65H 2301/414222; B65H 2301/41816; B65H 2301/46174; B65H 2301/46176; B65H 2301/4641; B65H 2408/236; B65H 2511/12; B65H 2511/16; B65H 2513/11; B65H 2515/12; B65H 2553/21; B65H 2553/26; B65H 26/00; B65H 2601/325; B65H 2701/30; B65H 2701/39; B65H 2701/5112; B65H 2701/5114; B65H 2701/515; B65H 2701/51524; B65H 2701/524; B65H 2801/84; B65H 49/04; B65H 49/06; B65H 49/10; B65H 54/72; B65H 57/18; B65H 63/082; B65H 67/0405; B65H 67/06; B65H 67/067; B65H 75/00; B65H 75/08; B65H 75/10; B65H 75/148; B65H 75/2236; B65H 75/2272; B65H 75/246; B65H 75/28; B65H 75/285; B65H 75/30; B65H 75/4457
See application file for complete search history.

(56) References Cited

FOREIGN PATENT DOCUMENTS

| | | | | | |
|------|---------------|-----|--------|-----------|---------|
| EP | 2213815 | A1 | * | 8/2010 | ............ E04H 6/245 |
| GB | 864193 | A | | 3/1961 | |
| JP | 2012056474 | A | * | 3/2012 | |

* cited by examiner

DEVICE AND METHOD FOR WEIGHING A SPOOL

CROSS REFERENCE TO RELATED APPLICATIONS

This application is a National Stage Application, filed under 35 U.S.C. § 371, of International Application No. PCT/EP2022/079680, filed Oct. 25, 2022, which international application claims priority to and the benefit of Swedish Application No. 2130309-4, filed Nov. 16, 2021; the contents of both of which as are hereby incorporated by reference in their entireties.

FIELD OF INVENTION

The present invention refers to a device and a method for weighing a roll on a spool at a weighing station in a continuous process. The device is preferably arranged adjacent to at least one of a pair of guide rails and comprises a damper and a load cell. The device and method can for example be used in a system for producing continuous web material, and especially paper material.

TECHNICAL BACKGROUND

In processes where a material is rolled on a spool, there is a need of weighing the spool at one or more stages in the process. Different types of weighing stations have been used during the years and is currently used to perform the weighing step.

To perform the weighing step, different types of scales are employed. Some of these scales are completely mechanical in nature while others employ hydraulic systems which can be connected to electric motors to pump the hydraulic fluid.

A problem with mechanical scales is that they require continuous maintenance because of the number of moving parts which such scales include. Furthermore, any mechanical scale is subject to wear and therefore be recalibrated periodically causing the weighing station to be out of service.

Hydraulic systems having electrically powered fluid pumps also require a relatively high level of maintenance as well as periodic recalibration. U.S. Pat. No. 4,137,977A describes a system for weighing spools of paper where the weight is measured using a hydraulic system. The hydraulic cylinder is provided with a retractable piston which can carry a force-responsive device such as a load cell. A problem with this system is that it is designed so that the spool must be lifted from the rails before the weight can be recorded.

U.S. Pat. No. 4,137,977A, along with other prior art systems, require that the spool is removed from the processing line in order to be weighed. The lifting of the spool, either to a different location or just upwards so that it is not in contact with the rails is also a safety problem. It is not safe for operators to be near the line during the weighing procedure if the spool is to be lifted in any way.

Regardless of the type of system used, prior art in this field typically has several movable parts and each movement requires a certain time to execute. For systems where the spool must be diverted from the processing line, the manufacturing process is slowed down by the weighing step. The weighing process is a time critical task, and the next process step will be delayed unless it can be carried out effectively.

U.S. Pat. No. 3,190,382 describes a weighing device and system for rapidly weighing rolls of paper without removing the rolls from the track leading from the wind-up. The rolls ride up onto support pads of the weighing system and are automatically stopped in generally centred relation with respect to these pads, by use of fluid pressure jacks, and are weighed by the depression of push rods extending from the pads. A problem with this type of system is that there is, as mentioned above, a lot of moving parts which all have to work for the system to be usable. The precision of weighing is dependent on several mechanical tolerances and a chain of component that are linked together. The number of components reduces the accuracy and introduces sources of error.

CN110823350A describes a roller weighing device for fabrics, where the roll is lifted upwards to a platform, rolls down to a claw placed above a weighing device, the claw retracts during weighing and the claw is then used to lift the roll up to the next platform. Like the other prior art mentioned above, this system also contains a lot of moving parts. It is further not adapted for a heavy roll since a heavy roll would damage the claw and/or greatly affect the mechanics of the arm when the roll falls down into the claw.

There is hence a need for a device and a system that is safe to use for the operators, which requires fewer mechanical parts and at the same time is efficient and have a high accuracy and repeatability.

SUMMARY OF THE INVENTION

A solution which is both safe, efficient and have high accuracy is a device for weighing wherein the actual weighing device is integrated with the rails, so that no lifting is required.

According to a first aspect of the invention, a device for weighing a roll of continuous web material on a spool at a weighing station in a continuous process is provided, which device is arranged adjacent to at least one of a pair of guide rails and comprises a damper and a load cell, wherein the load cell is integrated into at least one guide rail.

According to one embodiment of the invention the device is further provided with a brake device.

According to another embodiment, the device is further provided with a kicking device.

According to some embodiments the damper also functions as the kicking device.

According to a further embodiment the load cell is a load cell having transverse recess, preferably a V-shaped recess.

According to some embodiments the recess of the V-shape is in an orthogonal direction to the guide rails.

According to another embodiment, the device is further provided with a positioning sensor adjacent to the damper, with the ability to indicate that the spool has entered the weighing device.

In yet another embodiment the load cell comprises a main body of metal having at least one strain gauge.

According to a second aspect of the invention a system for weighing a roll of continuous web material on a spool, which system comprises two laterally spaced inclined guide rails, one on each side of the spool and two devices according to any of the ones described above. The two devices are arranged one adjacent to each guide rail.

According to a third aspect of the invention a method of weighing a roll of continuous web material on a spool at a weighing device, arranged adjacent to at least one of a pair of guide rails, which spool is transported along a pair of guide rails is provided, which method comprises the steps of:

i. decelerating a transporting speed of the spool along the guide rails to 0 m/s using a damper;

ii. weighing the spool on a load cell; and iv. ejecting the spool out of the weighing device;
    wherein the damper returns to its original position after
        step i so that no other parts than the load cell is in direct
        contact with the spool during the weighing step ii.

According to some embodiments, the method further comprises a braking step, which is a step of decelerating the spool's rotation around its axis using a brake device, wherein the brake returns to its original position after the braking step so that no other parts than the load cell is in direct contact with the spool during the weighing step.

According to some embodiments, the method further comprises a step of positioning the spool on the load cell before the weighing step.

According to some embodiments the spool is ejected out of the weighing station using a kicking device. According to some embodiments the spool is ejected out of the weighing station by using the damper as the kicking device.

According to some embodiments the load cell has a V-shaped recess, orthogonally to the direction of the guide rail.

SHORT DESCRIPTION OF THE DRAWINGS

Figure 1C:
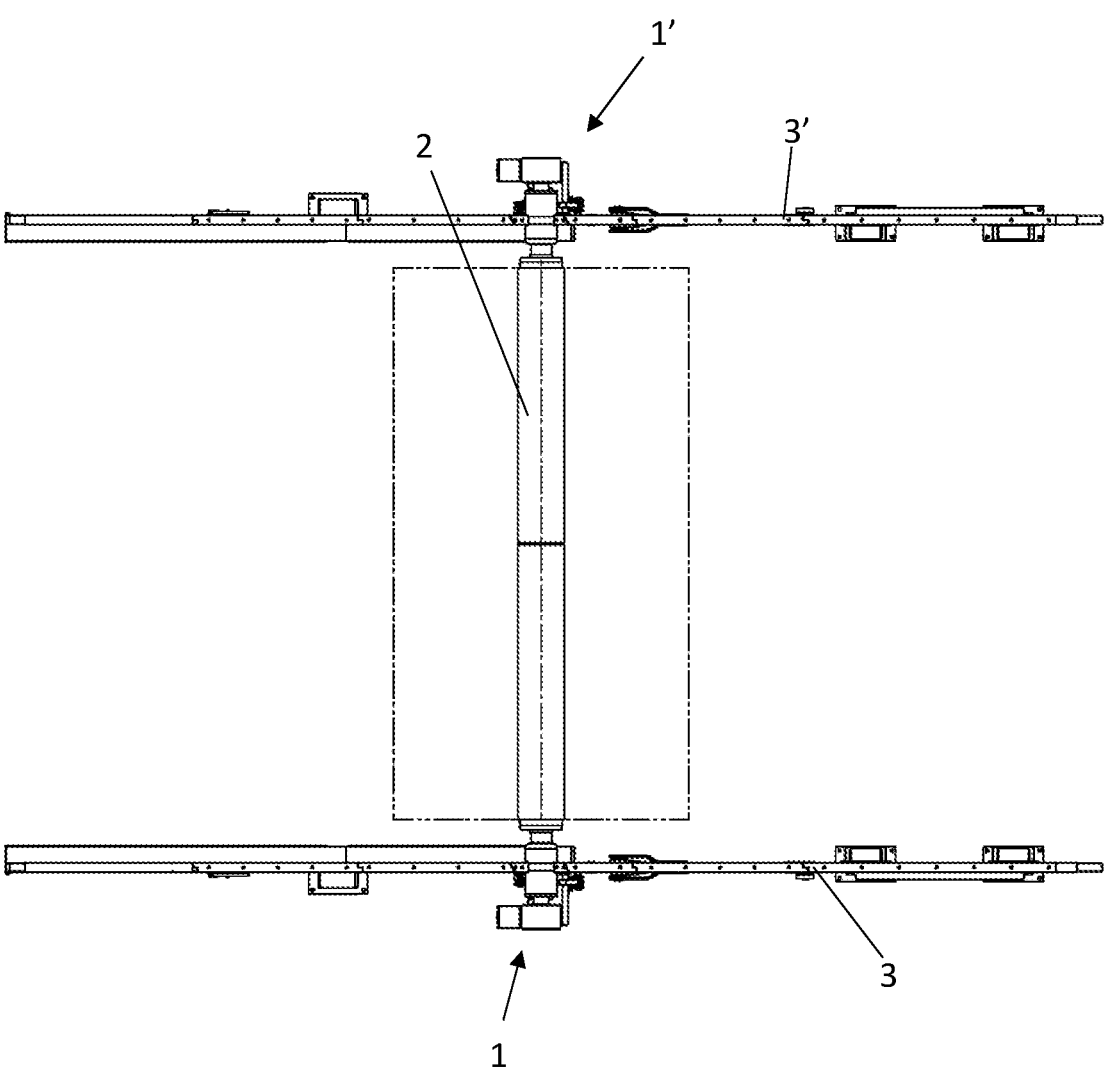
Figure 2A:
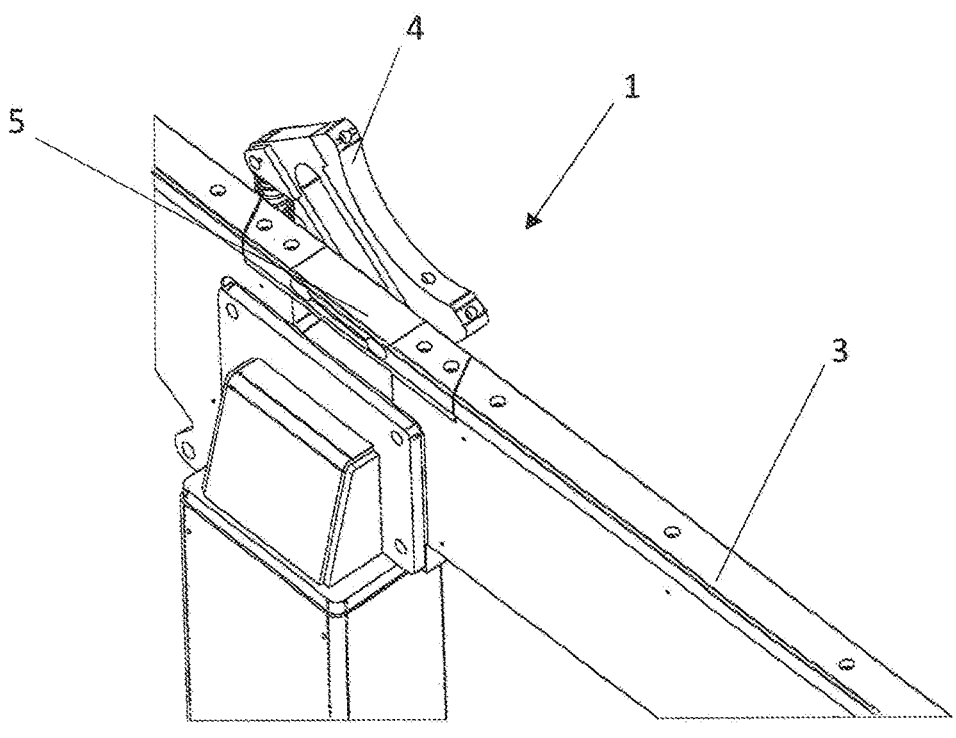
Figure 2B:
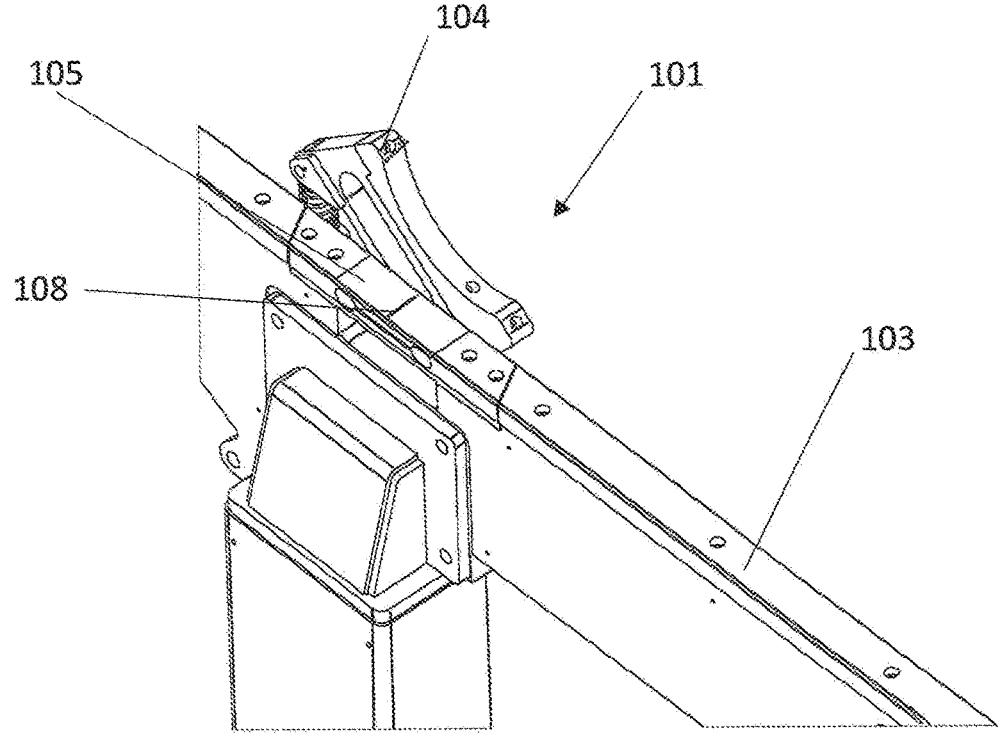
Figure 3A:
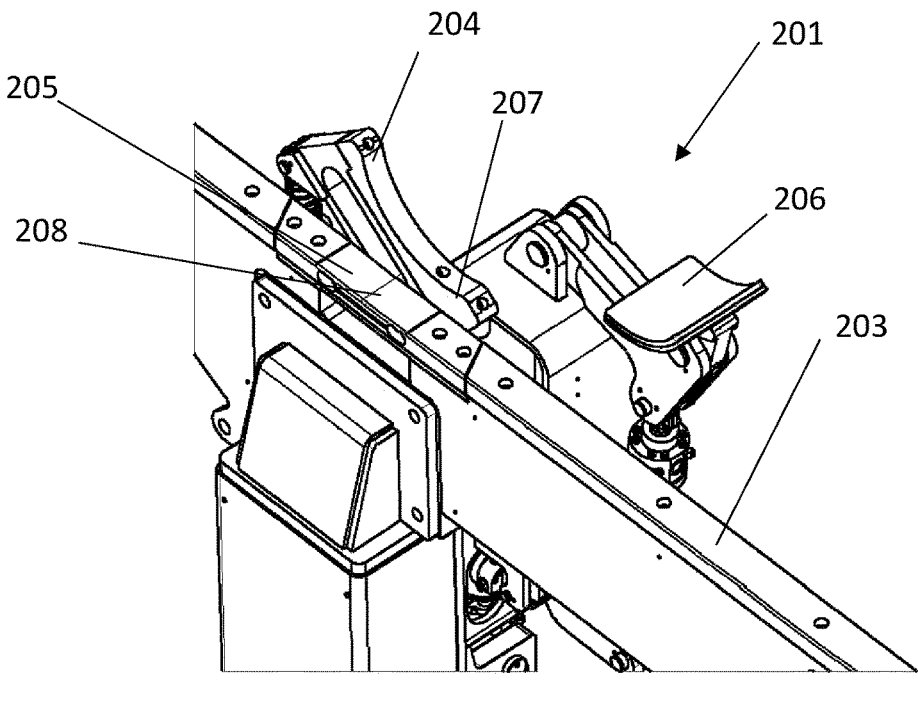
Figure 3B:
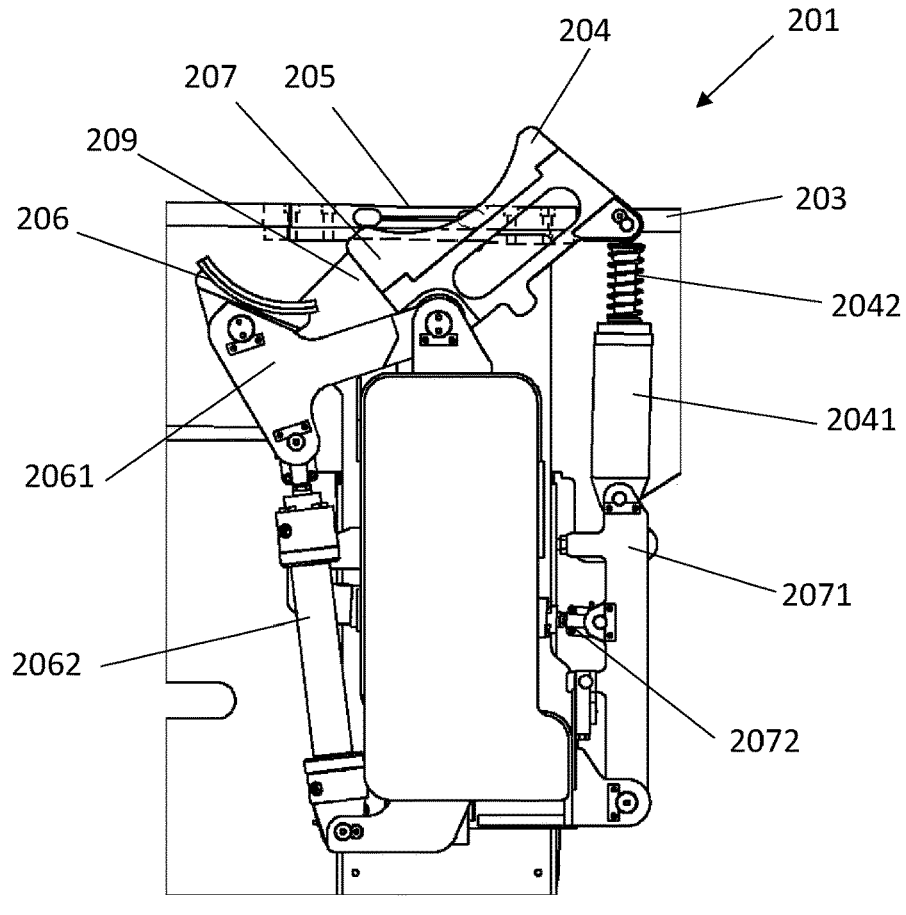

The present invention will be described in more detail under referral to the enclosed drawings, in which FIG. 1A shows an overview in perspective of a system for producing continuous web rolls on a spool FIG. 1B shows a perspective view of an enlargement of the end of a spool on a guide rail FIG. 1C shows a top view of a continuous process system comprising a weighing station FIG. 2A shows a perspective view of a first embodiment of a weighing device on a guide rail FIG. 2B shows a perspective view of a second embodiment of a weighing device on a guide rail FIG. 3A shows a perspective view further embodiment of a weighing device FIG. 3B shows a side view of a further embodiment of a weighing device FIG. 4A-4E shows the different positions for a weighing device during a method of weighing a spool in a continuous process

DETAILED DESCRIPTION OF EMBODIMENTS OF THE INVENTION

The present invention describes a device for weighing a roll of continuous web material on a spool at a weighing station in a continuous process. The device is arranged adjacent to at least one of a pair of guide rails.

A continuous process can be used in many applications and can comprise different types of stations along the guide rails. The roll of continuous web material is arranged on a spool, which spool is in direct contact with the rails. The roll of continuous web material will never be in contact with the rails or any other parts of the system. FIG. 1A shows an overview of such a system, wherein the spool 2 is arranged to be transported along a pair of guide rails 3,3'.

FIG. 1B shows an enlargement of one end of the spool 2 on one of the guide rails 3, one type of load cell 5 is also shown. The type of load cell used, can be varied which will be described more in detail below. This view is presented to show that it is only the spool that is in contact with the rail 3 and with the load cell.

In this description, the process described is a process for producing paper material, however, the device and method can be used in any system which is used for producing rolls of continuous web material on a spool.

In a typical continuous process, a roll is winded in the reel and the continuous web material is winded on a core shaft or a reel spool. When the roll reaches a set diameter the spool is ejected from the winding area and transported to the first station of the reel on guide rails with a set transporting speed. The guide rails will preferably have a small inclination, so that the spool moves forwards without the need for any external forces. Due to the slope of the rails, the spool moves in rotating motion along the guide rails until it reaches a brake, stop or the like. The winding of the material is preferably done counter clockwise and the rotating direction of the spool on the rails is in opposite direction.

The number of stations along the reel, as well as the order of stations, can be varied depending on the process and the examples herein is not intended to be limiting in any way. When the spool reaches the weighing station, the weight will be identified by a weighing device. The spool is thereafter ejected and continuous to the next station or if the weighing station is the end station, the spool is lifted off the rail and transported or stored until it is to be used.

In the system shown in FIG. 1C the spool 2 have been transported along the rails into the weighing station, with the ends of the spool 2 on each of the two guide rails 3,3' respectively. A first device 1 for weighing the spool have been arranged on one of the guide rails 3 and a second weighing device 1' have been arranged on the second guide rail 3'.

Although the system shown in FIG. 1C shows two weighing devices, one on each guide rail, it is also possible to have a system with one weighing device on one of the two guide rails.

In the present invention, the weighing device will never touch the material on the spool, it will only be in contact with the shaft ends of the core shafts or the reel spools (referred to as "spool" hereafter). This is advantageous because there are no parts of the device that can affect the weighing. In a system where for example the damper is in contact with the spool during weighing, it is a risk that the damper will change the weight recorded by the weighing device.

A first embodiment of a weighing device is shown in FIG. 2A. The weighing device 1 of FIG. 2A comprises a damper 4 and a load cell 5. The load cell is integrated into the at least one guide rail 3.

When the spool enters the weighing station, the damper 4 will decelerate the transporting speed of the spool along the guide rails until the spool comes to a complete stop. The damper is placed so that the complete stop occurs when the spool is in position on the load cell. The damper then returns to its original position, or is retracted so that weighing can be performed without any other parts being in contact with the spool during the weighing process.

The spool is thereafter on hold waiting for the system to eject the spool to the next station.

The type of load cell used in the weighing system can be varied depending on the type of spools that are to be weighed. The load cell has the ability to convert energy from one form to another. Load cells used in this application will convert the kinetic energy of compression or pressure, into a measurable electrical signal. The strength of the signal changes in proportion to the weight of the spool. The weight of the spool without any web material is known and the weight of the web material can be calculated from the signals from the load cell(s) and shown on a display, a control unit, or the like.

The use of a load cell integrated in the guide rails will give a system with less movable parts compared to other systems currently used in weighing systems for continuous processes. It has fewer movable parts and will hence require less maintenance and also have a higher reliability. The precision of weighing will hence be better.

All other parts of the weighing device according to this embodiment is as described in any of the embodiments previously described with reference to FIGS. 1A-C.

A second embodiment of a weighing device is shown in FIG. 2B. The weighing device 101 of FIG. 2B comprises a damper 104 and a load cell 105 having transverse recess 108, preferably a V-shaped recess. The load cell 105 is integrated into a guide rail 103. The weighing device 101 is arranged adjacent to and connected to the guide rail 103.

The load cell preferably has a recess in an orthogonal direction to the guide rails. When the spool is in position on the load cell, the recess will help the spool to stay in position for weighing without any other parts being in contact with the spool.

Another type of load cell that can be used in any of the embodiments described herein, is a load cell that comprises a main body of metal, preferably steel, and having at least one strain gauge. When a load is applied, the body of the load cell is slightly deformed, but, unless overloaded, always returns to its original shape. In response to the body shape changes, the strain gauges also change shape. This, in turn, causes a change in the electrical resistance of the strain gauge which can then be measured as a voltage change. Since this change in output is proportional to the amount of weight applied, the weight of the spool with the web material can then be determined from the change in voltage. The signal from the load cell(s) can then be recalculated into weight of the spool by the machine control system.

All other parts of the weighing device according to this embodiment is as described in any of the embodiments previously described with reference to FIGS. 1A-C and 2A.

The system can further be provided with a brake device to decelerate and stop the rotating motion of the spool. The brake device can either be a stand-alone brake device or can be a part of the weighing device. The brake device can be used with any of the embodiments described herein.

FIG. 3A shows a further embodiment of a weighing device 201 connected to a guide rail 203. The weighing device 201 comprises a brake device 206, which will stop the motion of the spool along the guide rail 203, a damper 204, a load cell 205 integrated in said guide rail 203 having transverse recess 208, and a kicking device 207 which will eject the spool after the weighing is completed.

The damper 204 device will, as described with reference to the other embodiments above, decelerate the transporting speed of a spool (not shown in FIG. 3A) when the spool moves closer to the load cell so that the spool comes to a stop. The damper 204 then return to its original position, or is retracted, so that weighing can be performed without any other parts being in contact with the spool during the weighing process.

The brake 206 will thereafter push the spool 202 against the damper 204 to help to stop the rotation around the axis of the spool. The brake 206 will then returns to its original position, or be retracted from the spool, so that no other parts than the load cell is in direct contact with the spool during the weighing of the spool. When a load cell 205 having a transverse recess 208 is used, the shape of the load cell will cause the spool to move slowly back towards the the of the load cell. The brake can be used to position the spool correctly on the load cell if necessary.

The weighing device 201 can further be provided with a kicking device 207 which will kick the spool out of the load cell so that it can be transported further to for example another next station along the guide rails. The kicking device can be used with any of the embodiments described herein.

The kicker device can be either be a stand-alone kicking device or can be a part of the brake device as described below.

All other parts of the weighing device according to this embodiment is as described in any of the embodiments previously described with reference to FIGS. 1A-C and 2A-B.

FIG. 3B is a side view of the alternative embodiment of the weighing device 201, which device comprises a damper 204, which will decelerate the transporting speed of the spool (not shown in FIG. 3B) along the guide rail 203 to 0 m/s, a brake 206, which will stop the rotation of the spool around its axis as described with reference to FIG. 3A above. In the position shown in FIG. 3B, the damper 204 is in an active position where it will decelerate the spool whereafter the brake stops the spool from rotation around its own axis by pushing it against the damper. Once the spool has come to a stop, the load cell 205 will register the weight of the spool. When the weighing is completed, the other end of the damper will function as a kicking device 207, which will kick the spool out from the position on the load cell and the weighing device so that it starts moving again along the guide rails.

The kicking device will preferably be controlled by an operator, which will give a command to the system to eject the spool from the station. The tissue spool will then continue the movement by gravity (due to the inclined railing) to the next station.

In this specific embodiment, an example of a hydraulic system to move the brake, damper and the kicker is shown. The brake 206 is connected to a brake arm 2061, which is used to push the brake against the spool to stop the rotational movement of the spool. A hydraulic cylinder 2062 is used to rotate and move the brake arm 2061 upwards. The damper 204 is a hydraulic damper comprising a hydraulic cylinder 2041 and a spring 2042, which hydraulic damper will decelerate the movement of the spool so that it stops smoothly on the load cell. When the spool is on the load cell the damper will return to its original position by means of a spring. The kicker device 207 is connected to a kicker arm 2071 which in turn is connected to a hydraulic cylinder 2072 to kick the device out of the weighing station when the weighing step is completed. Using the hydraulic cylinder 2072, the kicking arm 2071 is pushed to the right in the figure. It then pulls with it the damper 204 downwards so that the spool is able to roll freely on the rails again. The trailing edge of the damper is used as the kicking device which accelerates the spindle. The person skilled in the art understands that also other types of brake, damper and kicker arrangements/devices can be used, and it is not intended to limit the scope of the device to this example.

All other parts of the weighing device according to this embodiment is as described in any of the embodiments previously described with reference to FIGS. 1A-C and 2A-B.

The weighing device can further be provided with a positioning sensor 9;209 adjacent to the damper 4;104;204. The positioning sensor 9;209 have the ability to indicate that the spool has entered the weighing station and will hence improve the ability of the system to know that the spool has arrived at the weighing station and that damper in the weighing device should be initiated. It is also possible to add several positioning sensors to the system, for example to know when the weighing is completed, and the spool leaves the weighing device. The positioning sensor(s) can be used with any of the embodiments described herein.

A system for weighing a roll of continuous web material on a spool comprises two laterally spaced inclined guide rails 3;103;203,3';103';203', one on each side of the spool 2;102;202 and in some systems, it could be advantageous to have two weighing devices 1;101;201,1';101';201', one adjacent to each guide rail. The weight of the spool will thus be weighed by a load cell in each end of the spool and the values from both load cell will be sent to the machine control system.

All of the features mentioned above can be combined with each other in the different embodiments described.

The invention also covers a method of weighing a roll of continuous web material on a spool, using the device as described according to any of the embodiments above.

FIG. 4A-E shows the different positions for the spool, guide rail, load cell, brake, damper and kicker during a method of weighing a spool of continuous web material according to the invention.

The method of weighing a roll of continuous web material on a spool 2 which is transported along a pair of guide rails 3,3' is provided, comprises at least the steps of:
  i. decelerating a transporting speed of the spool 2 along the guide rails to 0 m/s using a damper 4;
  ii. weighing the spool on a load cell 5; and
  iii. ejecting the spool out of the weighing device
wherein the damper 4 returns to its original position after step i so that no other parts than the load cell 5 is in direct contact with the spool 2 during the weighing step ii.

The method could further comprise a step of decelerating the spools rotation around its axis using the brake device 106, which method will comprise the following steps in the following order:
  i. decelerating a transporting speed of the spool 2;102;202 along the guide rails to 0 m/s using a damper 4;104; 204;
  ii. decelerating the spool's rotation around its axis using a brake device 6;106;206;
  iii. weighing the spool on a load cell 5;105;205; and
  iv. ejecting the spool 2;102;202 out of the weighing device 1;101;201
wherein the damper 4;104;204 returns to its original position after step i, and the brake 6;106;206 returns to its original position after step ii so that no other parts than the load cell 5;105;205 is in direct contact with the spool 2;102;202 during the weighing step iii.

The method could further comprise a step of positioning the spool 2;102;202 on the load cell 5;105;205 before the weighing step. After the break have decelerated the rotation of the spool, the brake will return to its original position, or be retracted. When a load cell having a transverse recess 208 is used, the shape of the load cell will cause the spool to move slowly back towards the of the load cell. The damper arm could also be used to initiate this movement, and the brake arm can be used to guide the spool into or onto the load cell.

In cases where the load cell is a V-shaped load cell, which has an orthogonal recess, the brake will guide the spool into the recess in the middle of the load cell. A method according to this will comprise the following steps in the following order:
  i. decelerating a transporting speed of the spool 2;102;202 along the guide rails to 0 m/s using a damper 4;104; 204;

ii. decelerating the spool's rotation around its axis using a brake device 6;106;206;
  iii. positioning the spool 2;102;202 on the load cell 5;105;205;
  iv. weighing the spool 2;102;202 on a load cell 5;105;205; and
  v. ejecting the spool 2;102;202 out of the weighing device 1;101;201
wherein the damper 4;104;204 returns to its original position after step i, and the brake 6;106;206 returns to its original position after step ii so that no other parts than the load cell 5;105;205 is in direct contact with the spool 2;102;202 during the weighing step iv.

The step of ejecting the spool 2;102;202 out of the weighing device according to any of the methods described above can be performed using a kicking device 7;107;207. The damper 4;104;204 can be used as the kicking device.

The method could further comprise an optional step of indicating that the spool 2;102;202 has entered the station. A positioning sensor 9 (shown in FIG. 4B) placed at the damper will indicate that the spool has entered the station and is hence performed in combination with step i. in the methods described above. The positioning sensor can be used together with any of the embodiments described herein.

The steps of the methods described above are shown in FIG. 4A-E.

The figures shows the method with reference to the first embodiment, with the parts numbered 1-9, but is also applicable to the other embodiments, with corresponding parts 10X and 20X. The weighing device is shown as 1 but could also be 101 or 201, the spool is shown as 2 but could also be 102 or 202, the guide rail is shown as 3 but could also be 103 or 203 and so on for the rest of the numbered parts.

Figure 4A:
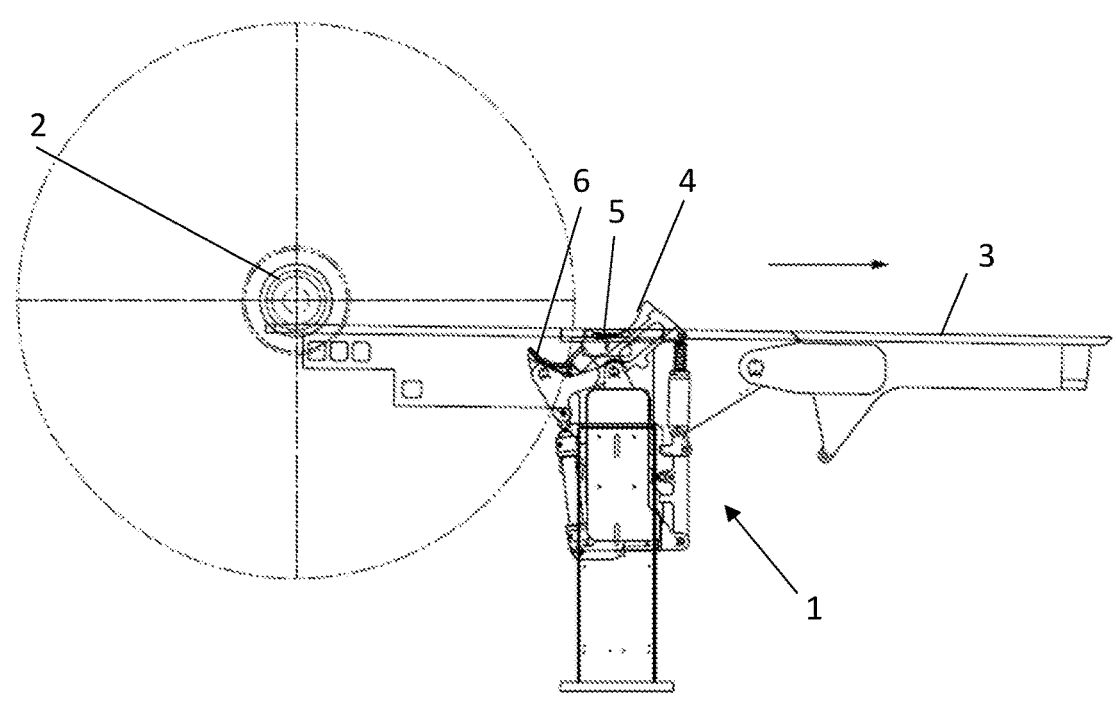

FIG. 4A shows the spool 2 on its way towards the weighing device 1 transported along the guide rail 3 towards the dampener 4 that is in its active position, waiting for the spool to come into position. The spool is moving along the guide rail in the direction of the arrow in the picture. As mentioned in the description above, the spool is rotating around its own axis in the opposite direction (counter-clockwise).

Figure 4B:
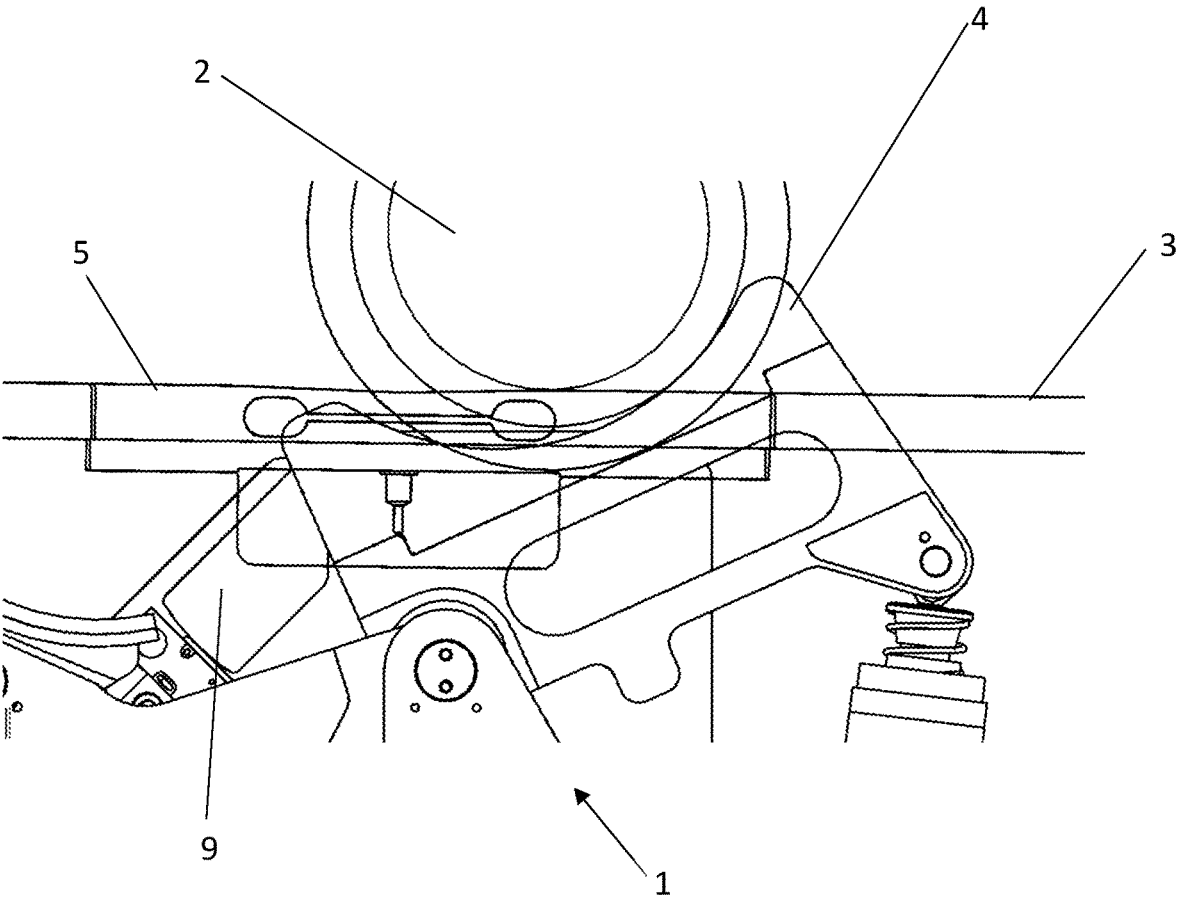

FIG. 4B shows the position of the different means in the device during step i. of the methods above. The figure is an enlargement of the device, wherein the damper 4 is decelerating the transporting speed of the spool 2 along the guide rails 3,3' to 0 m/s using a damper 4. The damper is in this figure in direct contact with the spool and thereby able to decelerate the speed.

Figure 4C:
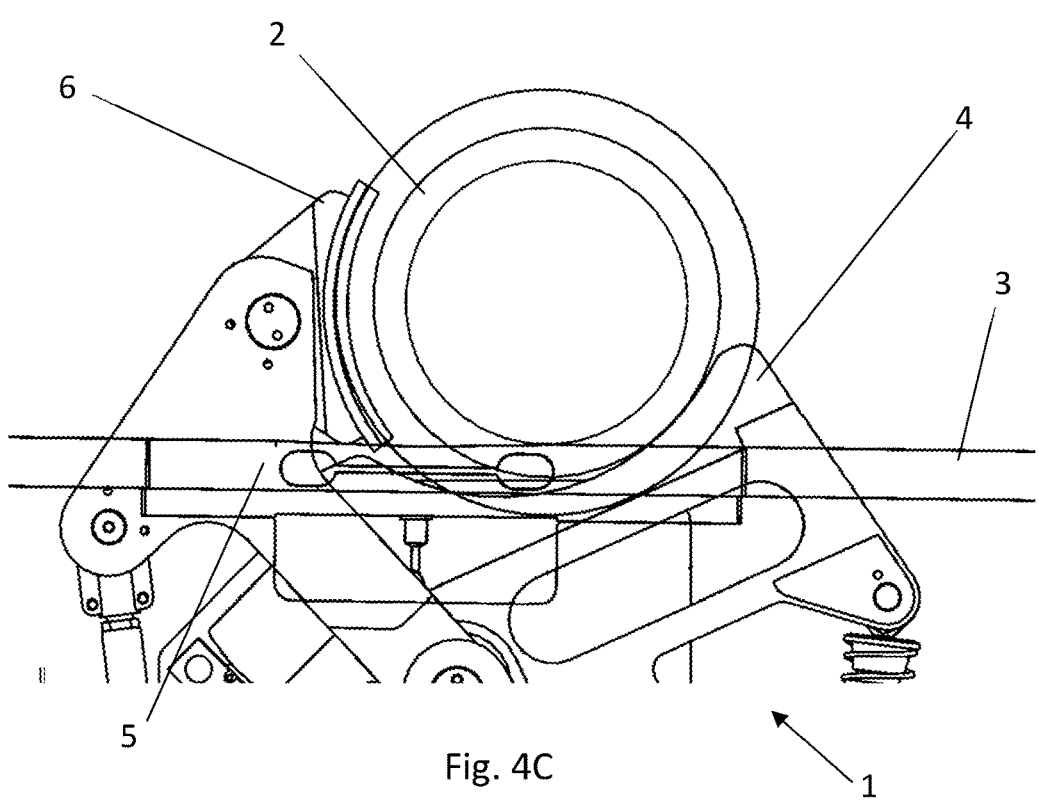

FIG. 4C shows an enlargement of the position of the different means in the device during the optional step of decelerating the spools rotation around its axis using the brake device 6. In this figure, the brake 6 is in direct contact with the spool 2 and thereby able to decelerate the rotation until the spool comes to a stop.

Figure 4D:
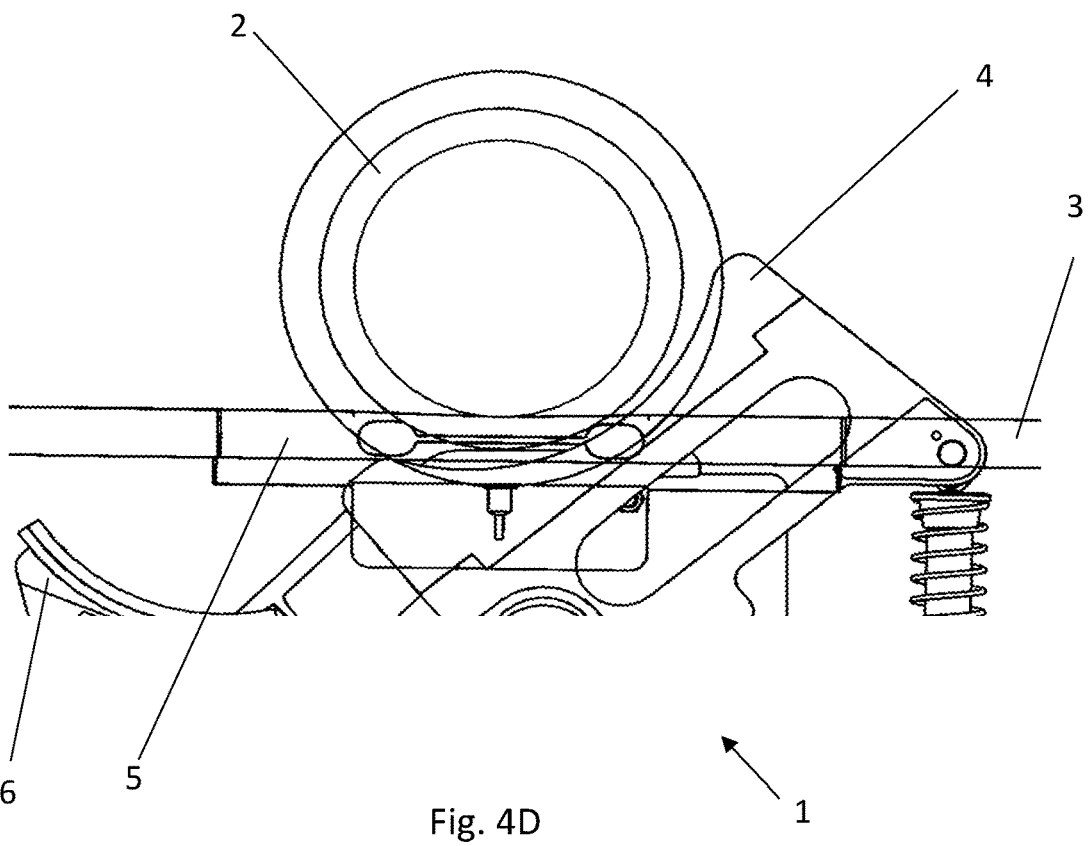

FIG. 4D shows an enlarged view of the position of the different means in the device, especially the brake 6 and the damper 4 during weighing. In this figure, it is clearly shown that neither the dampener or the brake is in direct contact with the spool 2, and the weighing can be performed by using the load cell 5 as described above with reference to the device 1.

Figure 4E:
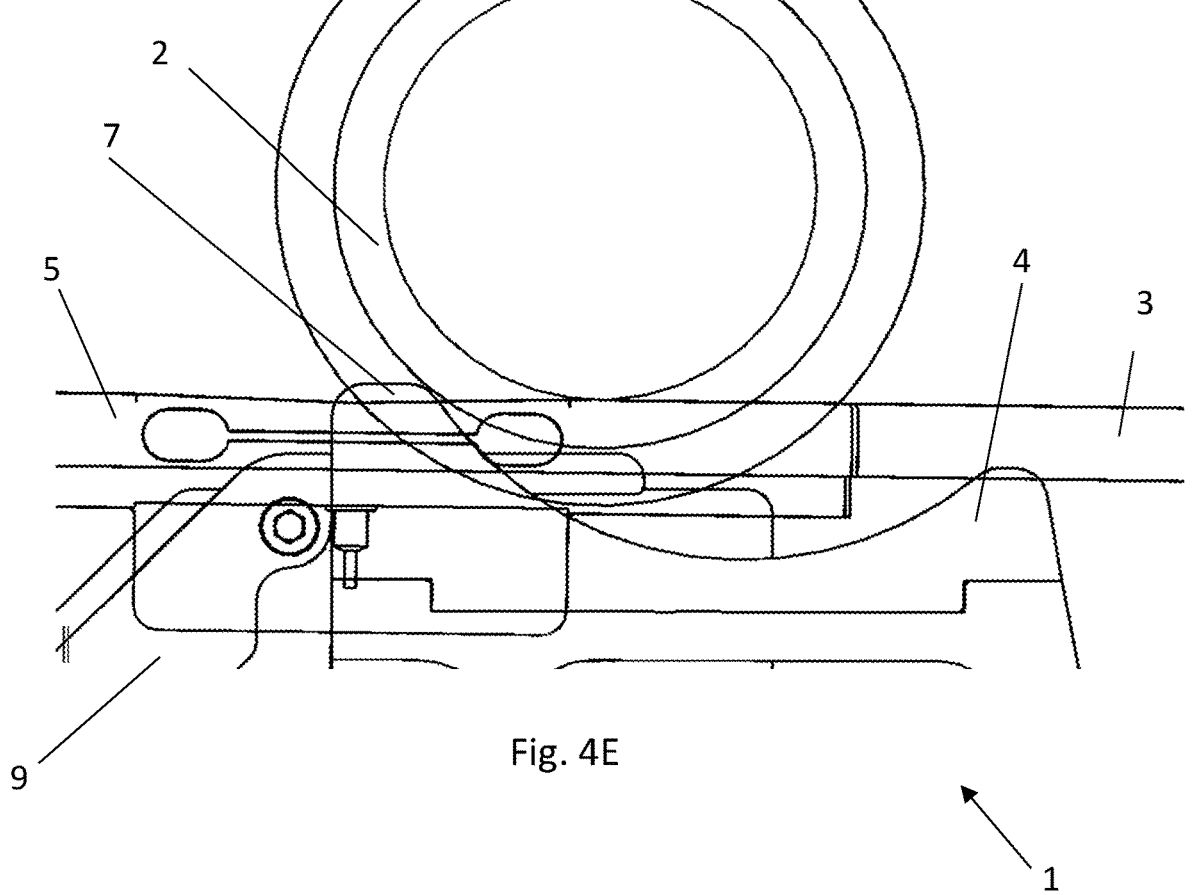

FIG. 4E shows an enlarged view of the position of the different means in the device during the optional step of using a kicking device 7 to push the spool 2 out of the weighing station comprising the weighing device 1. In this figure, the damper 4 also functions as the kicking device, by using the other end of the damper (the end opposite to the end that is used to decelerate transporting speed). As shown in FIG. 4B the kicking device 7 is in direct contact with the spool to kick/push the spool out from the load cell 5. The positioning sensor 9 is optional and functions as described above.

The spool 2 can be ejected out of the weighing device using any suitable device, it is however preferred to use a kicking device 7.

The device and method according to the present invention provides a safer and more time efficient weighing procedure of a spool with continuous web material. There is no need to lift the spool in any of the steps for the weighing procedure. This will of course provide a safer environment for the operators but will also reduce the time for the weighing procedure and thereby increase the efficiency.

The invention claimed is:

1. A Device for weighing a roll of continuous web material comprising:
   a spool arranged at a weigh station;
   said device arranged adjacent to at least one of a pair of guide rails on each side of the spool;
   a damper connected to the at least one of a pair of guide rails;
   a position sensor adjacent to the damper adapted to indicate the spool has entered the weigh station; A load Cell;
   wherein the load cell is integrated into at least one guide rail.

2. The device according to claim 1, further comprising a brake device (106;206).

3. The device according to claim 2, further comprising a kicking device (207).

4. The device according to claim 1, further comprising a kicking device (207).

5. The device according to claim 4, wherein the damper (4;104;204) also functions as the kicking device.

6. The device according to claim 1, wherein the load cell is a load cell having a transverse recess (108;208).

7. The device according to claim 6, wherein the transverse recess is a V-shaped recess.

8. The device according to claim 7, wherein the recess of the V-shape is in an orthogonal direction to the guide rails.

9. The device according to claim 1, wherein the load cell comprises a main body of metal having at least one strain gauge.

10. A system for weighing a roll of continuous web material on a spool;
    wherein the guide rails are two laterally spaced inclined guard rails one on each side of the spool and two devices according to claim 1.

11. A method of weighing a roll of continuous web material on a spool (2) at a weighing device (1), arranged adjacent to at least one of a pair of guide rails (3;3'), which spool is transported along said pair of guide rails (3,3'), wherein the method comprises the steps of:
    decelerating a transporting speed of the spool (2) along the guide rails to 0 m/s using a damper (4);
    weighing the spool (2) on a load cell (5), which load cell is integrated in the guide rails; and
    ejecting the spool out of the weighing device (1),
    wherein the damper (4) returns to its original position after step i so that no other parts than the load cell (5) is in direct contact with the spool during the weighing step.

12. The method according to claim 11, further comprising a step of positioning the spool on the load cell (5;105) before the weighing step.

13. The method according to claim 11, wherein the spool is ejected out of the weighing station using a kicking device (207).

14. The method according to claim 13, wherein the spool is ejected out of the weighing station by using the damper (4;104;204) as the kicking device (207).

15. The method according to claim 11, wherein the load cell has a V-shaped recess, orthogonally to the direction of the guide rail.

16. A method of weighing a roll of continuous web material on a spool (102) at a weighing device (101), arranged adjacent to at least one of a pair of guide rails (103; 103'), which spool (102) is transported along said pair of guide rails (103,103'), which method comprises the steps of:
    decelerating a transporting speed of the spool (102) along the guide rails to 0 m/s using a damper (104);
    decelerating the spool's rotation around its axis using a brake device (106);
    weighing the spool on a load cell (105); and
    ejecting the spool out of the weighing device (101)
    wherein the damper (104) returns to its original position after the first decelerating step, and the brake (106) returns to its original position after the second decelerating step so that no other parts than the load cell, which load cell is integrated in the guide rails, is in direct contact with the spool during the weighing step.

17. The method according to claim 16, further comprising a step of positioning the spool on the load cell (5;105) before the weighing step.

18. The method according to claim 16, wherein either the spool is ejected out of the weighing station using a kicking device (207) or the spool is ejected out of the weighing station by using the damper (4;104;204).

19. The method according to claim 16, wherein the load cell has a V-shaped recess, orthogonally to the direction of the guide rail.

\* \* \* \* \*